(12) United States Patent
Bengtsson et al.

(10) Patent No.: US 7,094,382 B2
(45) Date of Patent: Aug. 22, 2006

(54) METHOD AND A DEVICE FOR THE SEPARATION OF SULPHUR DIOXIDE FROM A GAS

(75) Inventors: Sune Bengtsson, Växjö (SE); Lars-Erik Johansson, Älmeboda (SE); Kjell Nolin, Asarum (SE); Mati Maripuu, Växjö (SE)

(73) Assignee: ALSTOM Technology Ltd, Baden (CH)

( * ) Notice: Subject to any disclaimer, the term of this patent is extended or adjusted under 35 U.S.C. 154(b) by 162 days.

(21) Appl. No.: 10/482,130

(22) PCT Filed: Jul. 4, 2002

(86) PCT No.: PCT/SE02/01333

§ 371 (c)(1),
(2), (4) Date: Mar. 25, 2004

(87) PCT Pub. No.: WO03/004137

PCT Pub. Date: Jan. 16, 2003

(65) Prior Publication Data

US 2004/0156769 A1     Aug. 12, 2004

(30) Foreign Application Priority Data

Jul. 5, 2001    (SE)   .................................... 0102412

(51) Int. Cl.
*B01D 53/50*      (2006.01)
*B01D 53/78*      (2006.01)

(52) U.S. Cl. ........................ 423/243.01; 423/243.08; 423/243.09; 422/168; 422/169; 422/170

(58) Field of Classification Search ........... 423/243.01, 423/243.08, 243.09; 422/168, 169, 170
See application file for complete search history.

(56) References Cited

U.S. PATENT DOCUMENTS 1,565,366 A     12/1925    Howard (Continued)

FOREIGN PATENT DOCUMENTS

EP      0 162 536 A1     11/1985

(Continued)

*Primary Examiner*—Stanley S. Silverman
*Assistant Examiner*—Timothy C. Vanoy
(74) *Attorney, Agent, or Firm*—Arthur E. Fournier, Jr.; Timothy J. Olson

(57) ABSTRACT

A device (1) for separating sulphur dioxide from a gas has an inlet (2) for the gas (4) and an outlet (42) for gas (40), from which sulphur dioxide has been separated. An apertured plate (20) is arranged between the inlet (2) and the outlet (42) and allows the gas (4) to pass from below. On its upper side (22), the apertured plate supports a flowing layer (24) of absorption liquid. An inlet duct (12) connects a container (6) for absorption liquid to the upper side (22) of the apertured plate (20). A means (10) conveys the absorption liquid (8) from the container (6), through the inlet duct (12), to the upper side (22) of the apertured plate (20) and along the apertured plate (20). The device also has an outlet box (30) for collecting the absorption liquid (8) flowing over the apertured plate (20) and at least one distribution means (34), which is arranged to contact the gas (4) which is supplied to the device (1) through the inlet (2) with the liquid (8) flowing from the outlet box (30) to the container (6) before the gas (4) passes through the apertured plate (20).

16 Claims, 4 Drawing Sheets

U.S. PATENT DOCUMENTS

| | | | |
|---|---|---|---|
| 4,099,925 A | 7/1978 | Yanagioka et al. | 23/285 |
| 4,239,515 A | 12/1980 | Yanagioka et al. | 55/223 |
| 4,263,021 A | 4/1981 | Downs et al. | 55/73 |
| 5,168,065 A * | 12/1992 | Jankura et al. | 436/55 |
| 5,246,471 A | 9/1993 | Bhat et al. | 55/223 |
| 5,660,616 A | 8/1997 | Choi et al. | 95/213 |
| 5,693,301 A * | 12/1997 | Åhman | 423/243.03 |
| 5,753,012 A | 5/1998 | Firnhaber et al. | 95/65 |
| 5,759,505 A * | 6/1998 | Nolin et al. | 423/243.08 |

FOREIGN PATENT DOCUMENTS

| | | |
|---|---|---|
| GB | 357599 | 9/1931 |
| WO | WO 96/00122 A1 | 1/1996 |

\* cited by examiner

V-V

METHOD AND A DEVICE FOR THE SEPARATION OF SULPHUR DIOXIDE FROM A GAS

FIELD OF THE INVENTION

The present invention relates to a method for separating sulphur dioxide from a gas by means of an aqueous absorption liquid, in which method the gas is conveyed upwards through a substantially horizontal apertured plate, on which a flowing layer of the absorption liquid is provided.

The invention also relates to a device for separating sulphur dioxide from a gas by means of an aqueous absorption liquid, which device comprises an inlet for gas containing sulphur dioxide and an outlet for gas, from which sulphur dioxide has been separated, a substantially horizontal apertured plate between the inlet and the outlet, which apertured plate is arranged to allow gas containing sulphur dioxide to pass from below and to support on its upper side a flowing layer of the absorption liquid, a container for the absorption liquid, at least one inlet duct, which connects the container to the upper side of the apertured plate, and at least one means for conveying the absorption liquid from the container, through the inlet duct, to the upper side of the apertured plate and along the apertured plate.

BACKGROUND ART

Sulphur dioxide is a gas which forms in the oxidation of sulphur-containing materials, such as coal, oil, natural gas, industrial and domestic waste, peat, etc. Sulphur dioxide can also form as a residual product in chemical processes, for instance metallurgical processes. Normally, it is not permitted to emit large amounts of sulphur dioxide into the atmosphere, which means that some kind of cleaning is necessary. One example of this is flue gas cleaning in power plants and other combustion plants. The flue gas that forms in combustion in such plants is usually cleaned, among other things, by absorption of sulphur dioxide into an absorption liquid. The absorption liquid can, for instance, contain water and one or more of the substances lime, limestone, dolomite, sodium hydroxide solution and similar substances, which are suitable for the absorption of sulphur dioxide. The flue gases can, for instance, be cleaned in a spray tower, as disclosed for instance in EP 0 162 536, or by means of a perforated tray, as disclosed for instance in U.S. Pat. No. 5,246,471. However, these devices for cleaning gases, in particular flue gases, from sulphur dioxide have been found to require a great deal of energy as large amounts of absorption liquid is pumped at a relatively high pressure.

U.S. Pat. No. 4,099,925, U.S. Pat. No. 5,660,616, U.S. Pat. No. 4,239,515 and WO 96/00122 describe cleaning apparatuses with low energy consumption. The flue gas is conveyed upwards through an apertured plate, on which a flowing layer of an absorption liquid is provided.

If the flue gas is not saturated with water vapour, water will evaporate from the absorption liquid and be added to the flue gas during the cleaning process. It has been found that this evaporation partially takes place when the flue gas passes through the apertured plate. One problem is that substances, such as lime, limestone, gypsum, calcium sulphite, sodium sulphate, etc, which are dissolved or suspended in the absorption liquid, tend to be evaporated and precipitated on the underside of the apertured plate and in the holes of the apertured plate. This increases the pressure drop across the apertured plate and makes the pressure drop vary over the area of the apertured plate. This results in increased energy consumption due to the increased pressure drop and in reduced absorption of sulphur dioxide due to the uneven distribution of flue gas in the layer of absorption liquid on the apertured plate. The prior-art solution to this problem is to arrange, before the cleaning apparatus with the apertured plate, a cooler in the form of a separate spray tower, for instance of the type disclosed in U.S. Pat. No. 5,753,012. In the separate spray tower, into which the flue gas is first introduced, an aqueous liquid is injected at a ratio (also called L/G) of the flow of liquid to the flow of flue gas of typically about 0.2–1 litre of liquid/m$^3$ of flue gas and at such a high pressure that the liquid is atomised and saturates the flue gas with water vapour. After being saturated with water vapour, the flue gas can be passed through the apertured plate without the risk of solids being precipitated. A separate spray tower is however a complicated and energy-consuming solution, which comprises pumps, pipes, tanks, control systems and a separate tower. In addition, when using such a spray tower semi-dry particles can form, which adhere to the underside of the apertured plate. It is therefore sometimes necessary to arrange a system for intermittent washing of the underside of the apertured plate.

SUMMARY OF THE INVENTION

Thus, the object of the present invention is to provide an efficient method for separating sulphur dioxide, in which method the above-mentioned drawbacks of prior-art technique are eliminated or reduced to a large extent.

According to the invention, this object is achieved by a method, which is of the type mentioned by way of introduction and characterised in that the absorption liquid is conveyed over the apertured plate from an inlet zone to an outlet zone in which the absorption liquid is collected and caused to flow downwards to a container for absorption liquid, the gas first being conveyed through a contact zone, in which it is contacted with the absorption liquid flowing downwards from the outlet zone to the container, and the gas then being conveyed upwards through the apertured plate and the flowing layer provided thereon for separating the sulphur dioxide. The contact zone substantially saturates the gas with water vapour, thereby reducing the risk of precipitation on the apertured plate. The contact zone also allows absorption of sulphur dioxide. When the absorption of sulphur dioxide takes place in two steps, i.e. first in the contact zone and then in the layer of absorption liquid provided on the apertured plate, the total absorption of sulphur dioxide will be improved. Since the absorption liquid first flows over the apertured plate and then reaches the contact zone, a counter-current will be provided, which favours absorption.

According to a preferred embodiment, an absorbent selected from lime, limestone and suspensions thereof is added to the absorption liquid. Lime and limestone are advantageous absorbents from an economic point of view since sulphur dioxide is to be separated from a great flow of flue gas. An absorption liquid containing lime or limestone is present in the form of a suspension of solids due to the limited solubility of the compounds included, such as limestone, gypsum and calcium sulphite. In the method according to the invention, there is less risk of the solids in said suspension adhering to the apertured plate and causing clogging of the same.

Suitably, the surface of the absorption liquid in the container is situated on a level below the contact zone, a passage, through which the gas is conveyed, being provided between the surface of the absorption liquid and the outlet zone, and a parameter representative of the level of the surface of the absorption liquid, and thus of the height of the passage, being controlled in such a manner that the average velocity of the gas in the passage is in the range of 5–35 m/s. This range has been found to yield a good contact between the gas and the absorption liquid, and thus a satisfactory degree of saturation with respect to the content of water vapour in the gas as well as a low pressure drop. By regulating the height of the passage, it is possible, at a varying gas flow, to keep the gas velocity within said desired range.

In a preferred method, the outlet zone comprises an outlet box with at least one distribution means for distributing in the contact zone the liquid flowing from the outlet zone to the container, the ratio of the hydrostatic pressure in the outlet box to the pressure difference in the gas between a first point immediately before the contact zone and a second point above the flowing layer of absorption liquid on the apertured plate being controlled in such a manner that said hydrostatic pressure is greater than said pressure difference in the gas. This ensures that gas will not flow into the outlet box and that liquid flows out of the distribution means and contacts the gas in the contact zone. It is yet more preferred for said ratio of the hydrostatic pressure to said pressure difference in the gas to be controlled in such a manner that the absorption liquid leaving the distribution means is given a velocity of 0.2–3 m/s. When the absorption liquid has this velocity, an efficient contact is obtained between the gas and the absorption liquid in the contact zone. The hydrostatic pressure required to obtain these velocities is relatively low, which results in low power consumption. This is because a high hydrostatic pressure in the outlet box results in a great lifting height of the absorption liquid that is to be returned from the container to the inlet zone.

According to a preferred embodiment, the gas is unsaturated before being introduced into the contact zone, the gas getting substantially saturated with water vapour when contacting in the contact zone the downwardly flowing absorption liquid. The saturation with water vapour considerably reduces the risk of any dissolved or suspended substances in the absorption liquid being precipitated on the underside of the apertured plate and causing problems of increased pressure drop in the apertured plate.

Another object of the present invention is to provide a simple device for separating sulphur dioxide, in which device the above drawbacks of prior-art technique are obviated or considerably reduced. According to the invention, this object is achieved by means of a device, which is of the type mentioned by way of introduction and which is characterised in that it also comprises at least one outlet box for collecting the absorption liquid flowing over the apertured plate, and at least one distribution means, which is arranged to contact the gas supplied to the device through the inlet with the liquid flowing from the outlet box to the container before the gas passes through the apertured plate.

Suitably, the distribution means comprises at least one nozzle. Nozzles, which can be designed in various ways, are often well suited for creating a jet of absorption liquid, of which the main part reaches the container and a minor part is entrained by the gas, the absorption liquid providing a good contact with the gas. Most types of nozzles are designed to provide a low pressure drop and a good distribution of liquid as well as a small risk of clogging. It is particularly preferable that the characteristic measure of the nozzles, such as a smallest hole diameter or a smallest gap width, should be 1–8 cm. These nozzle sizes result in a good distribution, a low pressure drop and a suitable size of the droplets that form in the contact with the absorption liquid. In said contact with the absorption liquid, droplets form in sizes within a wide range. Suitably, this range of sizes contains a certain amount of droplets, which quickly evaporate in the contact with a gas that is not saturated with water vapour. The main part of the liquid should not, however, be entrained by the gas but fall into the container.

The outlet box conveniently has a bottom, which is situated below the level of the upper side of the apertured plate. A bottom thus placed provides in an efficient manner a hydrostatic pressure which is sufficiently high to obtain the desired liquid velocity from the distribution means.

According to a preferred embodiment, the surface of the liquid in the container is situated under the outlet box, a passage being provided between the surface of the absorption liquid and the outlet box. This embodiment allows variation of the passage by changing the level of the surface of the absorption liquid in the container. At the same time a convenient collecting device is obtained, in which the absorption liquid which has passed through the passage is easily collected in the container. The surface of the absorption liquid, together with the absorption liquid flowing downwards from the distribution means; provides an efficient sealing of the passage, which reduces the risk of gas passing without contacting the absorption liquid. It is particularly preferable that the surface of the absorption liquid in the container also extend under substantially the entire apertured plate. This has the advantage that the container collects both the absorption liquid flowing out of the distribution means and the absorption liquid which can flow downwards through the holes of the apertured plate. In particular when the flow of gas is lower than the flow for which the device has been dimensioned, a considerable part of the layer flowing on the apertured plate will flow downwards through the holes of the apertured plate. When the surface of the liquid in the container extends under the surface of the entire apertured plate, all the absorption liquid flowing downwards via the distribution means and through the holes of the apertured plate will thus be collected in the container without any supplementary means, such as pumps and pipes, being needed.

According to a preferred embodiment, an overflow rim is arranged between the apertured plate and the outlet box. The overflow rim provides a certain smallest thickness of the layer flowing on the apertured plate. This is particularly advantageous in case of a low gas flow since otherwise there is a risk that the outlet box drains away the entire layer.

According to another preferred embodiment, the outlet box comprises control means, such as orifice plates, for regulating the velocity of the liquid flow through the distribution means. The control means can be used to adjust the function of the outlet box to the current operation mode, so that the most efficient operation of the device will be obtained at different gas flow rates.

Preferably, said means for feeding the absorption liquid to the upper side of the apertured plate comprises a mammoth pump. The mammoth pump allows transport of the absorption liquid and simultaneous oxidation of any oxidisable substances, such as sulphite, that may be present therein. A special advantage of the mammoth pump in the device according to the invention is that, in case of a great flow of gas, a great height is normally required in the passage and simultaneously a high degree of oxidation of sulphite. The characteristics of the mammoth pump also provide a great oxidation capacity at a great flow of absorption liquid, which is necessary to obtain a great height in the passage.

A venting zone for venting the absorption liquid is suitably arranged between the apertured plate and the distribution means. The venting leads to increased density of the absorption liquid, which increases the hydrostatic pressure in the outlet box. An increased hydrostatic pressure can be used to increase the liquid velocity through the distribution means. By venting, it is also possible to reduce the depth of the outlet box at a constant hydrostatic pressure.

BRIEF DESCRIPTION OF THE DRAWINGS

The invention will now be described in more detail by means of a number of embodiments and with reference to the accompanying drawings.

FIG. 3b is a top plan view showing an alternative embodiment of the bottom shown in FIG. 3a.

DESCRIPTION OF PREFERRED EMBODIMENTS

Figure 1:
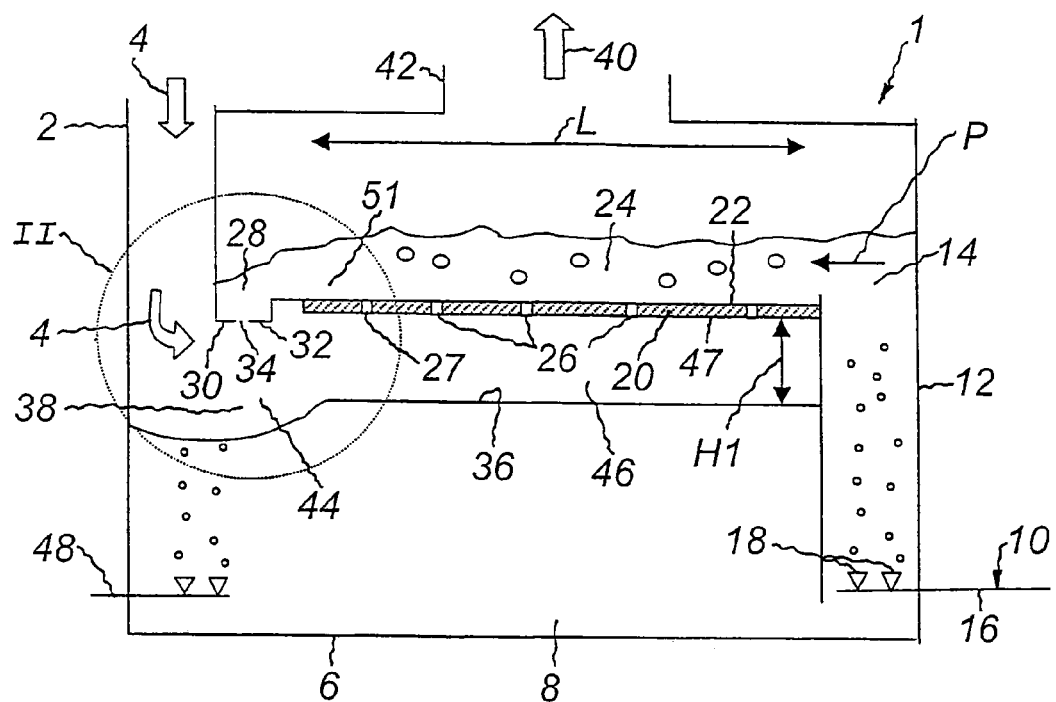
FIG. 1 is a side view in cross-section schematically showing a device according to the invention.

FIG. 1 shows a device 1 according to the present invention. The device 1 has an inlet 2 for flue gas 4 from a boiler (not shown). The lower portion of the device 1 is a tank 6, which is arranged to contain an absorption liquid 8. The device 1 also has a mammoth pump 10 for conveying absorption liquid 8 from the tank 6 through an inlet duct 12 to an inlet zone 14. The mammoth pump 10 is composed of a pipe 16, which conveys compressed air from a compressed air container (not shown), and a number of compressed air nozzles 18 for distributing the compressed air in the absorption liquid 8. The inlet zone 14 communicates with an apertured plate 20. The apertured plate 20 is arranged to support on its upper side 22 a layer 24 of absorption liquid 8 flowing over the upper side 22. The apertured plate 20 has a number of holes 26, which are uniformly distributed and through which the flue gases 4 can pass. The projection of the entire horizontal surface of the apertured plate 20 is situated inside the walls of the tank 6, so that absorption liquid 8 dripping down through the holes 26 of the apertured plate 20 is efficiently collected in the tank 6. Moreover, the device 1 has an outlet zone 28, which communicates with the upper side 22 of the apertured plate 20. The outlet zone 28 is situated at an end of the apertured plate 20 opposite to the inlet zone 14 at a distance L from the inlet zone 14. The outlet zone 28 comprises an outlet box 30 for collecting the absorption liquid 8 flowing in the form of the layer 24 over the apertured plate 20. The outlet box 30 has a bottom 32 which is provided with distribution means in the form of nozzles 34. Between the bottom 32 of the outlet box 30 and a surface 36 of the absorption liquid in the tank 6, there is a passage in the form of a gap 38, through which the flue gases 4 can pass. The gas 40 which has passed through the device 1 is conveyed through an outlet 42 for gas to after-treatment (not shown), which, for instance, may comprise separating droplets from the gas and reheating the gas to a temperature above the saturation temperature for water vapour. The absorption liquid 8 is substantially a mixture of water, limestone, which is supplied to the tank from a container (not shown) of limestone suspension, and gypsum and calcium sulphite formed when separating sulphur dioxide from the flue gas 4. The absorption liquid 8 can, for instance, be prepared in the manner described in WO 96/00122.

In the method according to the invention, a flue gas 4 is thus conveyed through the inlet duct 2 to the gap 38. In connection with the gap 38, absorption liquid 8 is added through the nozzles 34. The absorption liquid 8 is then contacted and mixed with the flue gas 4, whereby a contact zone 44 forms. In the contact zone 44, the absorption liquid 8 evaporates in part, the flue gas 4 getting substantially saturated with water vapour. Thus, when the flue gas 4 in the contact zone 44 is contacted with substantially all the amount of absorption liquid 8 flowing on the upper side 22 of the apertured plate 20, a satisfactory degree of saturation is obtained in the gas. The flue gas 4 is then further conveyed to a space 46 between the surface 36 of the absorption liquid and the apertured plate 20. The flue gas 4, which is substantially saturated after having passed through the gap 38, also contains droplets of absorption liquid 8 entrained from the contact zone 44. These entrained droplets will yield a flushing effect on the underside 47 of the apertured plate, which reduces the risk of precipitation of solids on the underside 47 of the apertured plate 20 and in the holes 26. The flue gas 4 is subsequently passed through the holes 26 in the apertured plate 20 and is dispersed while contacting the flowing layer 24 of absorption liquid 8 on the upper side 22 of the apertured plate 20, sulphur dioxide being separated from the flue gas 4 and dissolved in the absorption liquid 8. The gas 40, from which sulphur dioxide has been separated, then leaves the device through the gas outlet 42.

The bubbles of compressed air formed by the nozzles 18 of the mammoth pump 10 decrease the density of the absorption liquid 8 in the inlet duct 12. The absorption liquid 8 will thus flow upwards in the inlet duct 12, reach the inlet zone 14 and flow over the upper side 22 of the apertured plate 20, where it absorbs sulphur dioxide from the flue gas 4. In the absorption of sulphur dioxide, sulphite ions form in the absorption liquid 8. A high concentration of sulphite ions is not desirable as the risk of precipitation and incrustation of calcium sulphite increases. Since the mammoth pump 10 supplies air, powerful oxidation of the sulphite ions will be obtained in the inlet duct 12 at the same time as the absorption liquid 8 is conveyed upwards. If further oxidation is required, an oxidation device 48 supplied with compressed air from a compressed air container (not shown) can be installed near the bottom of the tank 6. When the absorption liquid has flowed over the entire apertured plate 20, it is conveyed to the outlet zone 28. In the outlet zone 28, no flue gas 4 is bubbled through the absorption liquid 8, whereby the absorption liquid 8 will be more or less vented, which entails increasing density. The absorption liquid is collected in the outlet box 30 and then flows out of the nozzles 34, is contacted with the flue gas 4 and is partially evaporated. The non-evaporated part of the absorption liquid 8 flowing out of the nozzles 34 hits the liquid surface 36 and merges with the absorption liquid in the tank 6.

As a result, the absorption liquid 8 will be conveyed over the upper side 22 of the apertured plate 20 and then be returned via the contact zone 44 to the tank 6 and be treated with air for oxidation of sulphite, before the absorption liquid 8 is conveyed again to the upper side 22 of the apertured plate 20. Thus, a counter-current process is provided where the absorption liquid 8 which has just absorbed sulphur dioxide on the upper side 22 of the apertured plate 20 and thus contacted the cleaned gas 40 is conveyed to the contact zone 44, in which it contacts the non-cleaned flue gas 4. Since the non-cleaned flue gas 4 contains greater amounts of sulphur dioxide than does the cleaned gas 40, considerable additional absorption of sulphur dioxide takes place also in the contact zone 44 owing to the counter-current process, in spite of the fact that the absorption liquid 8 has already absorbed great amounts of sulphur dioxide on the apertured plate 20. This counter-current process thus results in an improved capacity of the device 1 to absorb sulphur dioxide compared to prior-art technique and when comparable amounts of absorption liquid flow over the apertured plate 20.

Figure 2:
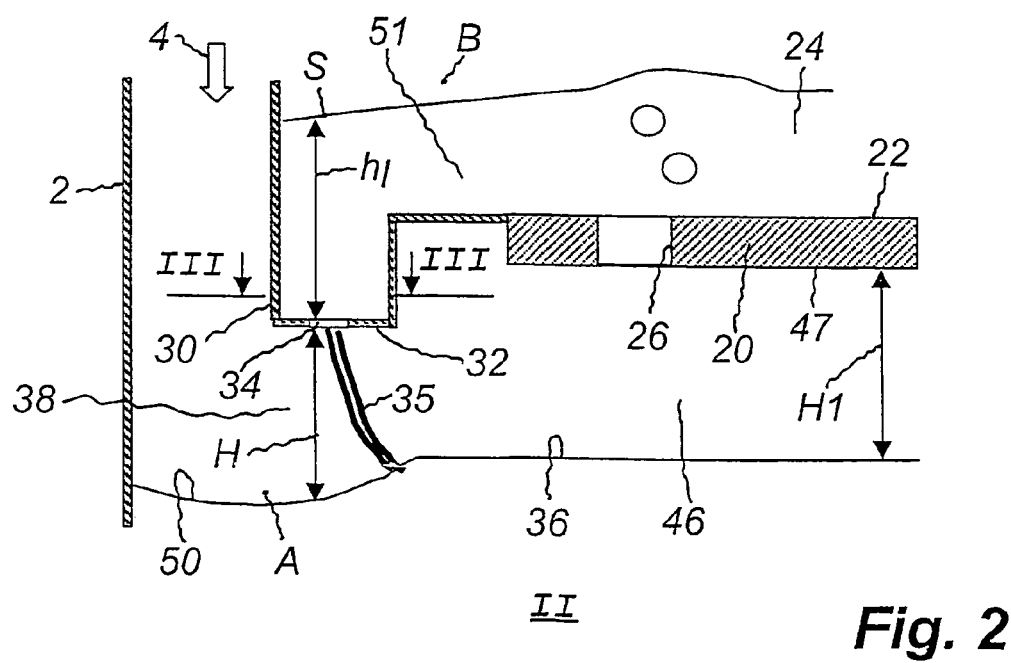
FIG. 2 is a side view in cross-section showing the portion II in FIG. 1 on a larger scale.

FIG. 2 shows the portion II in FIG. 1 on a larger scale. As is evident, the flue gas 4 will affect the surface 36 of the liquid and form a downwardly bending surface 50 near the inlet 2 for the flue gas 4. The exact appearance of this surface varies with the flow velocity of the gas 4 and the exact design of the device 1, and therefore the appearance of the surface 50 shown in FIG. 2 is to be considered as a schematic example. The flue gas 4 will also affect a flow 35 of absorption liquid 8, which leaves the nozzles 34 in such a manner that this flow 35 is not vertical but deflected in its lower part. It is important for the flow 35 to be so powerful as regards size of droplets and flow rate that a dense curtain of absorption liquid 8 is provided all the way from the outlet box 30 to the surface 36 of the absorption liquid. The gap 38 between the surface 36 of the absorption liquid and the outlet box 30 has at the nozzles 34 a height H, which is controlled by the level of the absorption liquid in the tank 6, i.e. the level of the surface 36 of the liquid. At a certain flow of flue gas 4, a certain height H will result in a certain velocity of the gas 4 in the gap 38. It has been found that this gas velocity should not exceed about 35 m/s. At higher gas velocities, the pressure drop increases in the gap 38. A yet more important disadvantage at higher velocities is that the flue gas 4 will entrain the main part of the absorption liquid 8 leaving the nozzles 34. This increases the pressure drop in the space 46 and fills the holes 26 with absorption liquid, whereby the pressure drop increases also in the holes; The gas velocity in the gap 38 should exceed about 5 m/s to ensure a good contact between the flue gas 4 and the absorption liquid 8 distributed by the nozzles 34. It has been found that in the case shown in FIG. 2, where the surface 36 of the liquid in the tank 6 extends over the same horizontal surface as the apertured plate 20, the height H is suitably at least about 10% of the bed length, i.e. the length L from the inlet zone 14 to the outlet zone 28. The flow of compressed air to the mammoth pump 10 is regulated to adjust the height H to a value which is suitable for the current operation mode. At an increasing flow of flue gas 4, the air flow to the mammoth pump 10 is increased, which increases the flow of absorption liquid 8 to the inlet zone 14. Owing to this, the thickness of the layer 24 increases, the amount of liquid in the tank 6 decreasing and the height H increasing. The gas velocity in the gap 38 can thus be maintained within the desired range. At the same time, the thicker layer 24 allows sufficient absorption of sulphur dioxide also at the higher flow of flue gas 4.

The outlet box 30 is designed in such a manner that a desired flow of absorption liquid 8 leaves the nozzles 34. To prevent the flue gas 4 from passing through the nozzles 34 instead of through the holes 26, the outlet box has to have a certain hydrostatic pressure $P_1$. A pressure difference $dP_r$ in the flue gas can be measured at a point A, which is situated immediately before the contact zone 44, and a point B, which is situated immediately above the layer 24. The hydrostatic pressure $P_1$ in the outlet box 30 can then be calculated as a height $h_1$, calculated from the bottom 32 of the outlet box 30 to a point S on the surface of the absorption liquid 8 situated just above the bottom 32 and multiplied by the density of the liquid in the outlet box 30 and the acceleration of gravity g.

The absorption liquid 8 leaving the nozzles 34 must have a certain velocity to create a good contact between this liquid and the flue gas 4 in the contact zone 44. It has been found that a liquid velocity of 0.2–3 m/s is convenient. To provide this liquid velocity, the hydrostatic pressure $P_1$ in the outlet box 30 has to be considerably greater than $dp_r$. It has been found that a height $h_1$, which is at least about 100 mm higher than the height required only to match $dP_r$, is suitable to provide said liquid velocity. It will also be understood that in case of a small height H, there will be a high pressure drop in the gap 38, which increases the pressure difference $dP_r$, which in turn requires a great height $h_1$ in the outlet box 30.

The absorption liquid 8 in the layer 24 will contain a relatively high amount of gas bubbles. It is desirable that the height $h_1$ should be as small as possible, while satisfying the above conditions, since the difference in level H1 between the underside 47 of the apertured plate 20 and the surface 36 of the liquid that has to be generated by the mammoth pump 10 to obtain the desired height H in the gap 38 will then be smaller, which reduces the consumption of compressed air in the mammoth pump 10. When the hydrostatic pressure $P_1$ in the outlet box 30 is proportional to the product of the height $h_1$ and the density of the absorption liquid 8 in the outlet box 30, it is necessary, in order to obtain the same hydrostatic pressure, to increase the density when the height $h_1$ is reduced. For this purpose, the downwardly directed vertical liquid velocity in the outlet box 30 is suitably about 0.1–1 m/s, preferably about 0.5 m/s. Such a velocity has been found to be suitable for providing satisfactory venting of the liquid, which increases the density of the liquid. For the same purpose, a venting zone 51 is arranged between the hole 2i of the apertured plate 20 which is the last hole, seen in the direction of flow P of the layer 24, and the outlet box 30. When the absorption liquid 8 flows over the venting zone S, gas bubbles leave the absorption liquid 8, which increases its density.

The entire flow of the absorption liquid flowing over the apertured plate 20 is used to be contacted with the flue gas 4 in the contact zone 44. A suitable ratio (also called L/G) of the flow of absorption liquid on the apertured plate 20 in the form of the layer 24 to the flow of flue gas 4 through the layer 24 provided on the apertured plate 20 is 10–50 liter of absorption liquid/m³ of flue gas. When this comparatively great flow of absorption liquid is contacted with the flue gas 4 in the contact zone 44, satisfactory saturation with water vapour and considerable absorption of sulphur dioxide are obtained in the contact zone 44.

Figure 3A:
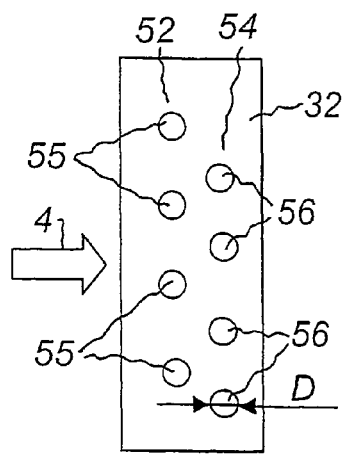
FIG. 3a is a top plan view showing the bottom of an outlet box shown in FIGS. 1 and 2.

FIG. 3a shows the bottom 32 of the outlet box 30 seen along the line III—III in FIG. 2. The bottom 32 is provided with a first row of nozzles 52, seen in the horizontal direction of flow of the flue gas 4, and a second row of nozzles 54, seen in the same direction of flow. The nozzles are in the form of circular holes 55 and 56, respectively. The circular holes 55, 56 can have a cylindrical shape or they can, at one end, be rounded, bevelled or have some other shape suited for nozzles. The smallest diameter D, i.e. the smallest cross-section of the hole 55, 56, should be about 1–8 cm, preferably about 1–5 cm. If the diameter of the hole is smaller than about 1 cm, droplets form as the absorption liquid 8 contacts the flue gas 4, which droplets are so small that they are entrained to a large extent by the flue gas 4, which entails the above-mentioned increased pressure drop in the space 46 and in the holes 26. When using holes 55, 56 with a larger diameter than about 8 cm, there is poor contact between the absorption liquid 8 and the flue gas 4, which results in insufficient saturation of the flue gas with water vapour. As evident from FIG. 3a, the holes 55 in the row 52 are displaced in relation to the holes 56 in the row 54. This is to obtain optimum coverage and contact with the absorption liquid 8 and the flue gas 4, so that no streaks of flue gas 4 will pass the contact zone 44 without being supplied with water vapour.

Figure 3B:
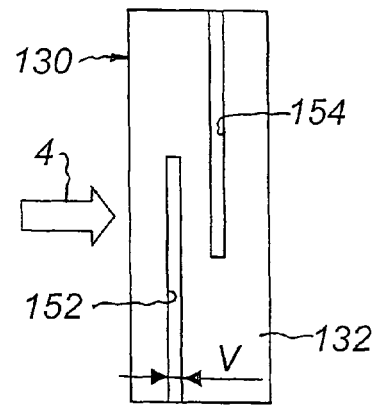

FIG. 3b shows an alternative embodiment of the outlet box 30 shown in FIG. 3a. The outlet box 130 shown in FIG. 3b has a bottom 132, which is provided with a first gap 152, seen in the horizontal direction of flow of the flue gas 4, and a second gap 154, seen in the same direction of flow. The two gaps 152, 154 overlap each other, so that no streaks of flue gas 4 can pass the contact zone 44 without contacting the absorption liquid 8. The gaps 152, 154 can be rectangular in cross-section or be rounded, bevelled or have some other shape suited for nozzles at their inlet and/or outlet. The smallest gap width V, i.e. the smallest cross-section of the gap 152, 154, should be about 1–5 cm for the same reason as mentioned above in connection with the circular holes 55, 56.

Figure 4A:
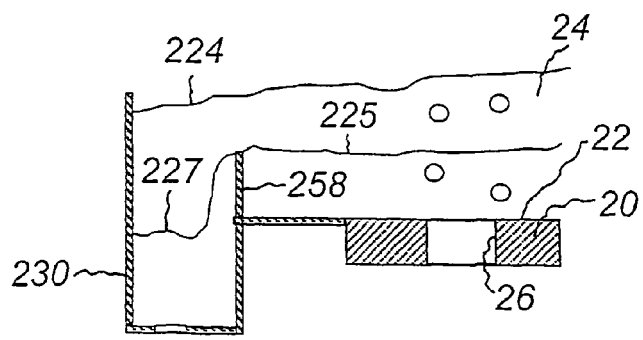
FIG. 4a is a side view in cross-section showing an outlet box provided with an overflow rim.

FIG. 4a shows an alternative embodiment of the outlet box shown in FIG. 2. In low-load operation, i.e. when the flow of flue gas 4 is lower than the flow for which the device 1 is dimensioned, it is sometimes a problem that the layer 24 flows over the apertured plate 20 at too high a velocity. This is because when the flow of gas decreases also the pressure difference $dP_r$ falls. As a result, the flow velocity in the nozzles 34 increases and the layer 24 is thus quickly drained via the outlet box 30. To provide, under these circumstances, a layer 24 which is sufficiently thick for the required degree of absorption of sulphur dioxide, the flow of compressed air in the mammoth pump 10 has to be increased, which increases the operating costs in low-load operation. This is why the embodiment of an outlet box 230 shown in FIG. 4a has an overflow rim 258. In normal load operation, i.e. a normal flow of flue gas 4, the normal level 224 of the layer 24 will not be affected at all by the overflow rim 258. In low-load operation, i.e. a small flow of flue gas 4, the low-load level 225 of the layer 24 will be considerably higher, owing to the overflow rim 258, than the level 227 in the outlet box 230. The low level 227 in the outlet box 230 also reduces the hydrostatic pressure and thus also the velocity at which the absorption liquid 8 flows out of the outlet box 230. Consequently, a balance is obtained, in which the flow of liquid out of the outlet box 230 is balanced by the level 227. Thus the fact that the layer 24, owing to the overflow rim 258, can reach the level 225 makes it possible to reduce the consumption of compressed air in the mammoth pump 10 in low-load operation.

Figure 4B:
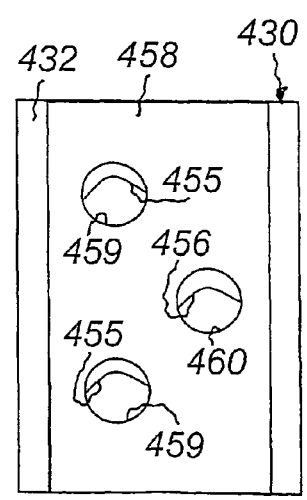
FIG. 4b is a top plan view of the bottom which is shown in FIG. 3a and provided with an orifice plate.

FIG. 4b shows another alternative embodiment of the bottom shown in FIG. 3a. The outlet box 430 shown in FIG. 4b, which is seen from above, has a bottom 432 provided with circular holes 455, 456 in a manner similar to that shown in FIG. 3a. Immediately on top of the bottom 432 of the outlet box 430, an orifice plate 458 is arranged. The orifice plate 458, which can be displaced relative to the bottom 432, has circular holes 459 and 460, which correspond to the holes 455 and 456, respectively. By displacing the orifice plate 458 it is thus possible to provide a greater or a smaller reduction of the respective openings of the holes 455 and 456. In low-load operation, it is thus possible to reduce the holes 455 and 456 to reduce the outflow of absorption liquid 8 from the outlet box 430.

Figure 5A:
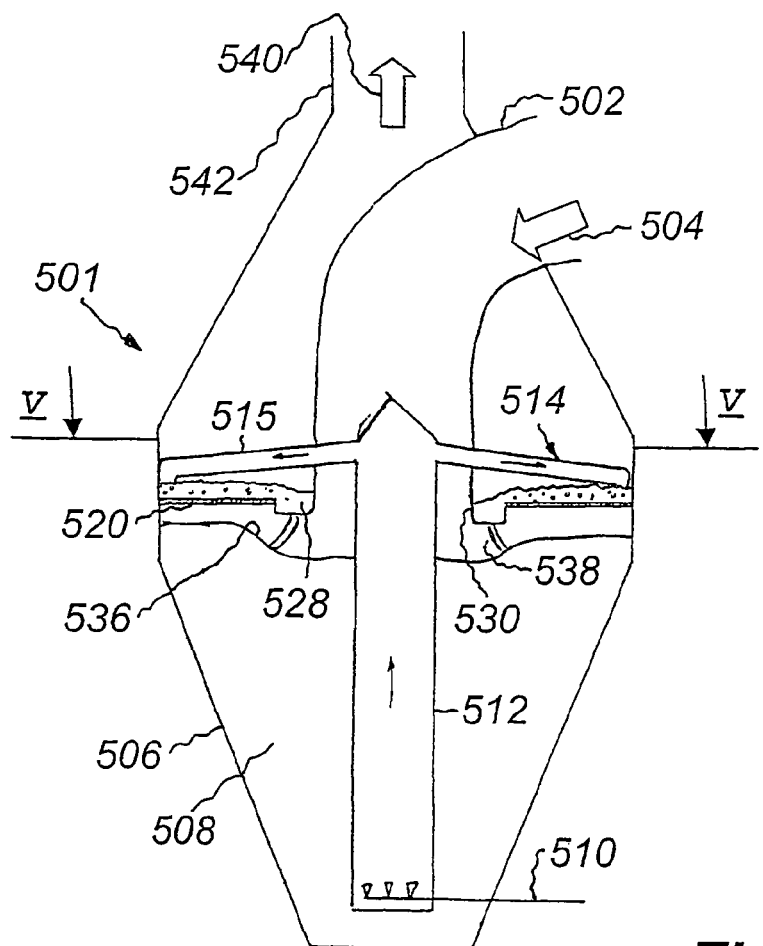
FIG. 5a is a side view in cross-section showing an embodiment of the invention in the form of a circular device.
Figure 5B:
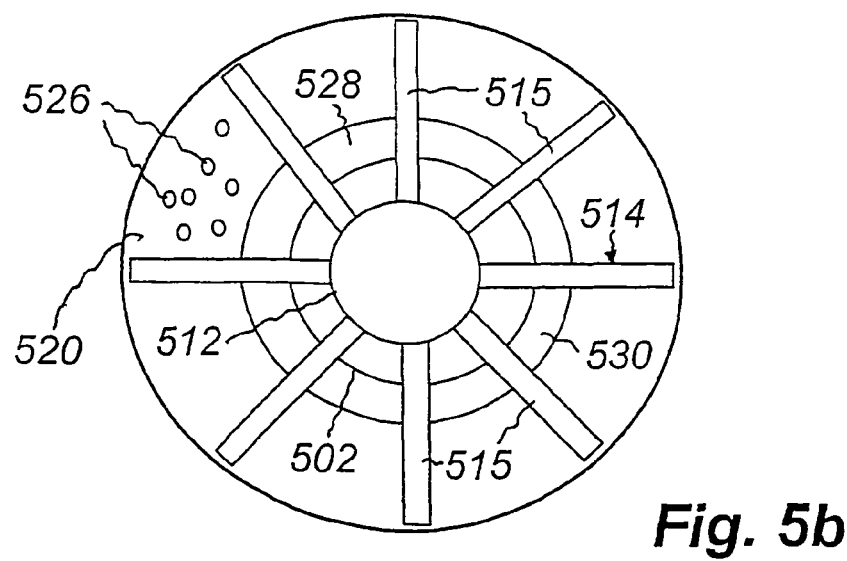
FIG. 5b is a top sectional view of the device shown in FIG. 5a along the line V—V.

FIG. 5a shows a circular embodiment of a device 501 according to the present invention. In FIG. 5b, the device 501 in FIG. 5a is shown in cross-section along the line V—V. The device 501 has a central inlet 502 for flue gas 504. The lower portion of the device 501 is a tank 506, which is arranged to contain an absorption liquid 508. The device 501 further has a mammoth pump 510 for conveying absorption liquid 508 from the tank 506 through an inlet duct 512 to an inlet zone 514. The inlet zone 514 has eight pipes 515 conveying absorption liquid 508 to an apertured plate 520 of the above-described type. The apertured plate 520 has a plurality of uniformly distributed holes 526, of which only a few are shown in FIG. 5b and through which the flue gas 504 can pass. The device 501 further has an outlet zone 528, which communicates with the upper side of the apertured plate 520. The outlet zone 528 comprises an outlet box 530 for collecting the absorption liquid 508 flowing over the apertured plate 520. The outlet box 530, which extends around the inlet 502, is suitably designed in the manner described above in connection with outlet boxes. Between the bottom of the outlet box 530 and a surface 536 of absorption liquid in the tank 506, there is a passage in the form of a gap 538, through which the flue gas 504 can pass. The gas 540 which has passed through the device 501 is conveyed through a gas outlet 542 to after-treatment (not shown). The centrally placed duct 512 and the pipes 515 can as an alternative be replaced by a plurality of mammoth pumps, for example six, placed along the outer periphery of the apertured plate 520.

Figure 6A:
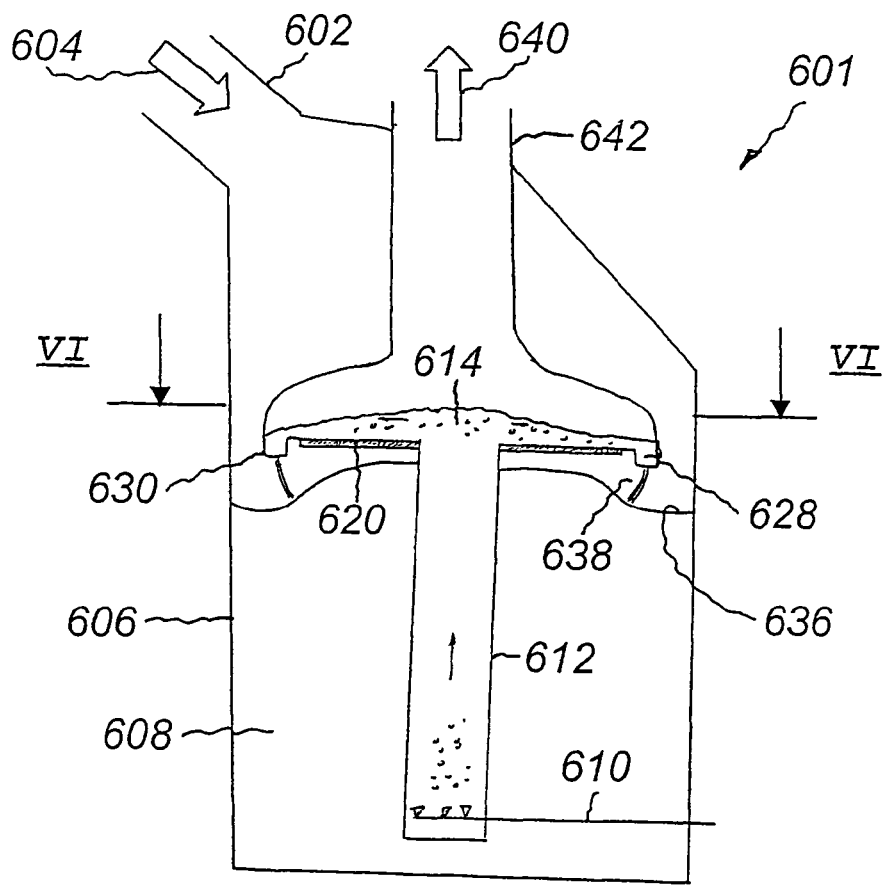
FIG. 6a is a side view in cross-section showing yet another alternative embodiment of the invention in the form of a circular device.
Figure 6B:
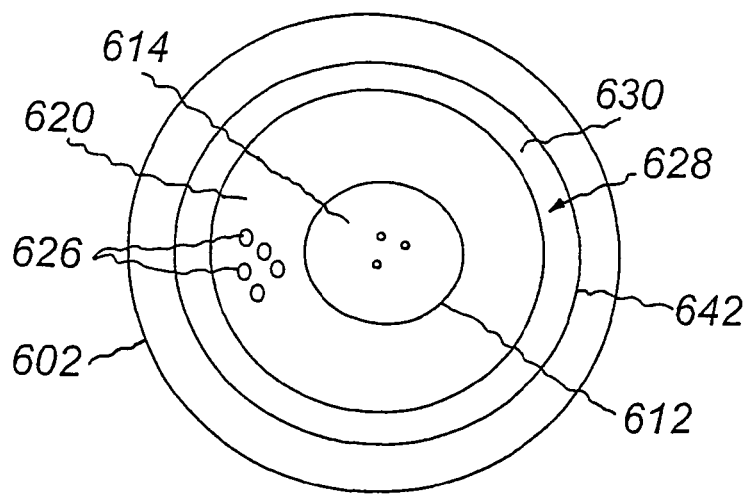
FIG. 6b is a top sectional view of the device shown in FIG. 6a along the line VI—VI.

FIG. 6a shows yet another embodiment of a device 601 according to the present invention. In FIG. 6b, the device 601 in FIG. 6a is shown in cross-section along the line VI—VI. The device 601 has a laterally arranged inlet 602 for flue gas 604. The lower portion of the device 601 consists of a tank 606, which is arranged to contain an absorption liquid 608. The device 601 also has a mammoth pump 610 for conveying absorption liquid 608 from the tank 606 through a central inlet duct 612 to an inlet zone 614. The inlet zone 614 conveys absorption liquid 608 to an apertured plate 620, which is of the above-described type. The apertured plate 620 has a number of uniformly distributed holes 626, of which only a few are shown in FIG. 6b and through which the flue gas 604 can pass. The device 601 further has an outlet zone 628, which communicates with the upper side of the apertured plate 620. The outlet zone 628 comprises an outlet box 630 for collecting the absorption liquid 608 flowing over the apertured plate 620. The outlet box 630 is suitably designed in the manner described above in connection with outlet boxes. Between the bottom of the outlet box 630 and a surface 636 of absorption liquid in the tank 606, there is a passage in the form of a gap 638, through which the flue gas 604 can pass. The gas 640 which has passed through the device 601 is conveyed through a central gas outlet 642 to after-treatment (not shown).

It will be understood that a number of modifications of the above embodiments of the invention are conceivable within the scope of the invention, such as defined in the appended claims.

The absorption of sulphur dioxide can be carried out using a number of different absorption liquids. Examples of substances which mixed with water are suitable for separating sulphur dioxide are limestone, lime, dolomite, sodium hydroxide, etc. Thus, the device is not limited to a particular composition of absorption liquid.

The device according to the invention can be designed in various ways. Besides the circular designs described above, also rectangular, square and sector-shaped devices are conceivable.

The mammoth pumps can be replaced by a different type of pump, for instance a propeller pump. Mammoth pumps are, however, particularly preferred owing to the simultaneous oxidation effect. It is also possible to let a plurality of small mammoth pumps feed absorption liquid to the apertured plate. In some embodiments of the device, this is preferable since a more even distribution of the absorption liquid is obtained over the upper side of the apertured plate.

The apertured plate can be designed in various different ways and be made of a number of different materials. A particularly preferred way of making an apertured plate is described in WO 96/00122. When using apertured plates made of a polymer material, the entering gas has to have a low temperature so as not to damage the apertured plate, and this is possible to achieve by means of the present invention. The contact zone can be provided with devices, which improve the contact between the gas and the liquid. Such devices can, for instance, be vertical grids or static mixers. It is, however, often preferable to use an open design, i.e. a design in which the contact zone does not comprise any parts which may cause clogging and thereby an increased pressure drop in the gap between the outlet box and the surface of the absorption liquid in the tank.

The above embodiments are used in cleaning flue gases from a coal-fired boiler. It will be understood that the invention can also be used in other processes, where sulphur dioxide is to be separated from a gas. Examples of such processes are firing with oil, peat, biofuel and waste, such as industrial and domestic waste; metallurgical processes, such as steel and copper making processes; concrete production processes and refining processes, such as oil refinement and natural gas refinement. The device can also be used for absorbing other substances together with sulphur dioxide. Examples of such substances are hydrogen halogenides, such as hydrogen chloride, hydrogen fluoride, hydrogen bromide and hydrogen iodide; bromine; heavy metals, such as mercury; and other compounds.

As mentioned above, the contact zone 44 allows saturation of the flue gas 4 with water vapour as well as absorption of sulphur dioxide from the flue gas 4. The invention can be used when only saturation of the flue gas 4 with water vapour in the contact zone 44 is desired, when the flue gas 4 is already saturated with water vapour and when only absorption of sulphur dioxide in the contact zone 44 is desired and when simultaneously saturation of the flue gas 4 with water vapour and absorption of sulphur dioxide from the flue gas 4 is desired in the contact zone 44.

EXAMPLE

This example relates to a pilot test with a device of the type described above with reference to FIGS. 1–2 and 3a.

The bed length L of the device was about 3 meters. The apertured plate 20, which was made of polypropylene, had a thickness of 30 mm and a free hole area of about 3.6%, the holes 26 having a diameter of 22 mm. The holes 26 were bevelled on the underside 47 of the apertured plate 20. Limestone having such a grain size that about 96% passed a mesh size of 44 μm was supplied to the tank 6 in the form of 25% by weight in aqueous suspension. More water was added to the tank 6. During operation, the absorption liquid 8 in the tank contained about 13% by weight of solids and had a pH of about 4.5.

Flue gas 4 from an oil-fired power plant was cleaned, the entering gas which was unsaturated with water vapour having a temperature of about 191° C. and a sulphur dioxide concentration of about 732 ppm. The flue gas 4 was conducted through the inlet 2 to the gap 38. The surface 36 of the liquid in the tank 6 was adjusted to such a level that the gas velocity in the gap 38 was 12 m/s. At this gas velocity, the height H constituted 15% of the bed length L. The pressure difference between the point A and the point B was estimated at 4600 Pa. The height $h_1$ in the outlet box 30 was 700 mm, which corresponded to a hydrostatic pressure of about 6000 Pa. The circular holes 55, 56 at the bottom of the outlet box had a diameter of about 2 cm. The number of circular holes 55, 56 was selected so that the velocity of the liquid leaving the holes 55, 56 at the current hydrostatic pressure was about 1.5 m/s. As far as could be judged from a visual inspection, the gas 4 entrained about 10% of the absorption liquid leaving the circular holes 55, 56 at the bottom 32 of the outlet box 30, whereas the rest of the absorption liquid reached the surface 36 of the liquid. During the test, no clogging in the holes 26 of the apertured plate 20 and no incrustation on the underside 47 of the apertured plate 20 could be detected. A distinct washing effect, which was provided by the absorption liquid entrained by the gas 4, could also be observed on the underside 47. Measurement showed that the gas 4 had a temperature of about 57° C. immediately under the apertured plate 20 and was substantially saturated with water vapour. The gas 40 leaving the device 1 had a temperature of about 55° C. and contained about 6 ppm of sulphur dioxide.

The invention claimed is:

1. A method for separating sulphur dioxide from a gas by means of an aqueous absorption liquid, in which method the gas is conveyed upwards through a substantially horizontal apertured plate, on which a flowing layer of the absorption liquid is provided, wherein the absorption liquid is conveyed over the apertured plate from an inlet zone to an outlet zone in which the absorption liquid is collected and caused to flow downwards to a container for absorption liquid, the gas first being conveyed through a contact zone, in which it is contacted with the absorption liquid flowing downwards from the outlet zone to the container, and the gas then being conveyed upwards through the apertured plate and the flowing layer provided thereon for separating the sulphur dioxide.

2. The method as claimed in claim 1, in which an absorbent selected from lime, limestone and suspensions thereof is added to the absorption liquid.

3. The method as claimed in claim 1 or 2, in which the surface of the absorption liquid in the container is situated on a level below the contact zone, a passage, through which the gas is conveyed, being provided between the surface of the absorption liquid and the outlet zone, and a parameter representative of the level of the surface of the absorption liquid, and thus of the height (H) of the passage, being controlled in such a manner that the average velocity of the gas in the passage is in the range of 5–35 m/s.

4. The method as claimed in claim 1, in which the outlet zone comprises an outlet box with at least one distribution means for distributing in the contact zone the liquid flowing from the outlet zone to the container, the ratio of the hydrostatic pressure in the outlet box to the pressure difference in the gas between a first point (A) immediately before the contact zone and a second point (B) above the flowing layer of absorption liquid on the apertured plate being controlled in such a manner that said hydrostatic pressure is greater than said pressure difference in the gas.

5. The method as claimed in claim 4, in which said ratio of the hydrostatic pressure to said pressure difference in the gas is controlled in such a manner that the absorption liquid leaving the distribution means is given a velocity of 0.2–3 m/s.

6. The method as claimed in claim 1, in which the gas is unsaturated before being introduced into the contact zone, the gas getting substantially saturated with water vapour when contacting in the contact zone the downwardly flowing absorption liquid.

7. A device for separating sulphur dioxide from a gas by means of an aqueous absorption liquid, which device comprises:
   a) an inlet containing sulphur dioxide and an outlet for gas, from which sulphur dioxide has been separated,
   b) a substantially horizontal apertured plate between the inlet and the outlet, which apertured plate is arranged to allow gas containing sulphur dioxide to pass from below and to support on its upper side a flowing layer of the absorption liquid,
   c) a container for the absorption liquid,
   d) at least one inlet duct, which connects the container to the upper side of the apertured plate, and
   e) at least one means for conveying the absorption liquid from the container, through the inlet duct, to the upper side of the apertured plate and along the apertured plate, wherein the device also comprises
   f) at least one outlet box for collecting the absorption liquid flowing over the apertured plate, and
   g) at least one distribution means, which is arranged to contact the gas supplied to the device through the inlet with the liquid flowing from the outlet box to the container before the gas passes through the apertured plate.

8. The device as claimed in claim 7, in which the distribution means comprises at least one nozzle.

9. The device as claimed in claim 8, in which the characteristic measure of the nozzle is a smallest hole diameter (D) or a smallest gap width (V) of 1–8 cm.

10. The device as claimed in claim 7, in which the outlet box has a bottom, which is situated below the level of the upper side of the apertured plate.

11. The device as claimed in claim 7, in which the surface of the liquid in the container is situated under the outlet box, a passage being provided between the surface of the absorption liquid and the outlet box.

12. The device as claimed in claim 11, in which the surface of the absorption liquid in the container also extends under substantially the entire apertured plate.

13. The device as claimed in claim 7, in which an overflow rim is arranged between the apertured plate and the outlet box.

14. The device as claimed in claim 7, in which said means for feeding the absorption liquid to the upper side of the apertured plate comprises a mammoth pump.

15. The device as claimed in claim 7, in which a venting zone for venting the absorption liquid is arranged between the apertured plate and the distribution means.

16. The device as claimed in claim 7, in which the outlet box comprises control means for regulating the velocity of the liquid flow through the distribution means, said control means comprising orifice plates.

* * * * *